United States Patent
Dieduksman et al.

(10) Patent No.: US 9,419,375 B2
(45) Date of Patent: Aug. 16, 2016

(54) CONNECTOR FOR A CABLE AND CONNECTOR ASSEMBLY

(71) Applicant: TE Connectivity Nederland BV, s'Hertogenbosch (NL)

(72) Inventors: Andreas Winandus Dieduksman, s'Hertogenbosch (NL); Tekke Drijfhout, Nistelrode (NL); Freddy Jean Philip Dendas, Genk (BE)

(73) Assignee: TE Connectivity Nederland BV, S-Hertogenbosch (NL)

( * ) Notice: Subject to any disclaimer, the term of this patent is extended or adjusted under 35 U.S.C. 154(b) by 0 days.

(21) Appl. No.: 14/747,371

(22) Filed: Jun. 23, 2015

(65) Prior Publication Data

US 2015/0372417 A1    Dec. 24, 2015

(30) Foreign Application Priority Data

Jun. 24, 2014  (EP) ..................... 14173783

(51) Int. Cl.
  *H01R 13/58*   (2006.01)
  *G02B 6/38*    (2006.01)

(52) U.S. Cl.
  CPC .......... *H01R 13/5825* (2013.01); *G02B 6/3807* (2013.01); *G02B 6/3894* (2013.01)

(58) Field of Classification Search
  CPC ............... H01R 13/58; H01R 13/5804; H01R 13/5812; H01R 13/582; H01R 13/5825; H01R 13/59
  See application file for complete search history.

(56) References Cited

U.S. PATENT DOCUMENTS

| | | | | |
|---|---|---|---|---|
| 7,938,674 | B2* | 5/2011 | Lindkamp | H01R 13/59 439/461 |
| 8,246,377 | B2* | 8/2012 | Lindkamp | H01R 13/5829 439/461 |
| 8,313,250 | B2* | 11/2012 | Drouard | G02B 6/4477 174/520 |
| 8,317,548 | B2* | 11/2012 | Sagdic | H01R 13/502 439/441 |
| 8,766,109 | B2* | 7/2014 | Duval | H01R 13/59 174/650 |
| 8,790,128 | B2* | 7/2014 | Andresen | H01R 4/2433 439/320 |
| 9,153,898 | B2* | 10/2015 | Dendas | H01R 13/516 |
| 2006/0144611 | A1* | 7/2006 | Chiu | H01R 9/03 174/74 R |
| 2008/0200056 | A1* | 8/2008 | Huang | H01R 13/59 439/310 |
| 2013/0164979 | A1* | 6/2013 | Dendas | H01R 13/59 439/607.01 |
| 2013/0224989 | A1* | 8/2013 | Giefers | H01R 13/512 439/452 |
| 2015/0280349 | A1* | 10/2015 | Thelen | H01R 13/502 439/701 |
| 2015/0280360 | A1* | 10/2015 | Thelen | H01R 13/502 439/465 |
| 2015/0372417 | A1* | 12/2015 | Dieduksman | G02B 6/3807 439/461 |
| 2016/0047994 | A1* | 2/2016 | Conner | G02B 6/3887 385/87 |

* cited by examiner

*Primary Examiner* — Ross Gushi
(74) *Attorney, Agent, or Firm* — Barley Snyder (57) ABSTRACT

A connector for a cable has an outer housing, an inner housing at least partially received within the outer housing, a strain reliving attachment mechanism, and a rotational locking mechanism. The strain relieving attachment mechanism has an assembly path with an preliminary mating position and a final mating position. The rotational locking mechanism is engaged with the strain relieving attachment mechanism along the assembly path from a locking position located between the preliminary mating position and the final mating position. The rotational locking mechanism couples the inner housing to the outer housing in a rotatory locked manner upon engagement with the strain relieving attachment mechanism.

20 Claims, 10 Drawing Sheets

Fig. 9E though the locking mechanism 8, which in FIG. 1 does not yet couple the housing

CONNECTOR FOR A CABLE AND CONNECTOR ASSEMBLY

CROSS-REFERENCE TO RELATED APPLICATION

This application claims the benefit of the filing date under 35 U.S.C. §119(a)-(d) or (f) of European Patent Application No. 14173783.3, filed Jun. 24, 2014.

FIELD OF THE INVENTION

The invention is generally related to an electrical connector, and, more specifically, to an electrical connector assembly.

BACKGROUND

Conventional connectors often have a plurality of housings for protecting the connector or for attaching the connector to a complimentarily-shaped mating connector. However, in many cases the plurality of housings can only fulfill this function when the housings are in a specific position relative to each other. To ensure that the housings remain in a desired relative position, connectors often have locking mechanisms. One problem with conventional connectors is that if the locking mechanism is not operated correctly or operated at a wrong time, the housings cannot fulfill their function, and parts of the connector, the cable or the mating connector can be damaged.

SUMMARY

A connector for a cable has an outer housing, an inner housing at least partially received within the outer housing, a strain reliving attachment mechanism, and a rotational locking mechanism. The strain relieving attachment mechanism has an assembly path with an preliminary mating position and a final mating position. The rotational locking mechanism is engaged with the strain relieving attachment mechanism along the assembly path from a locking position located between the preliminary mating position and the final mating position. The rotational locking mechanism couples the inner housing to the outer housing in a rotatory locked manner upon engagement with the strain relieving attachment mechanism.

BRIEF DESCRIPTION OF THE DRAWINGS

The invention will now be described by way of example, with reference to the accompanying Figures, of which.

DETAILED DESCRIPTION OF THE EMBODIMENT(S)

Figure 1:
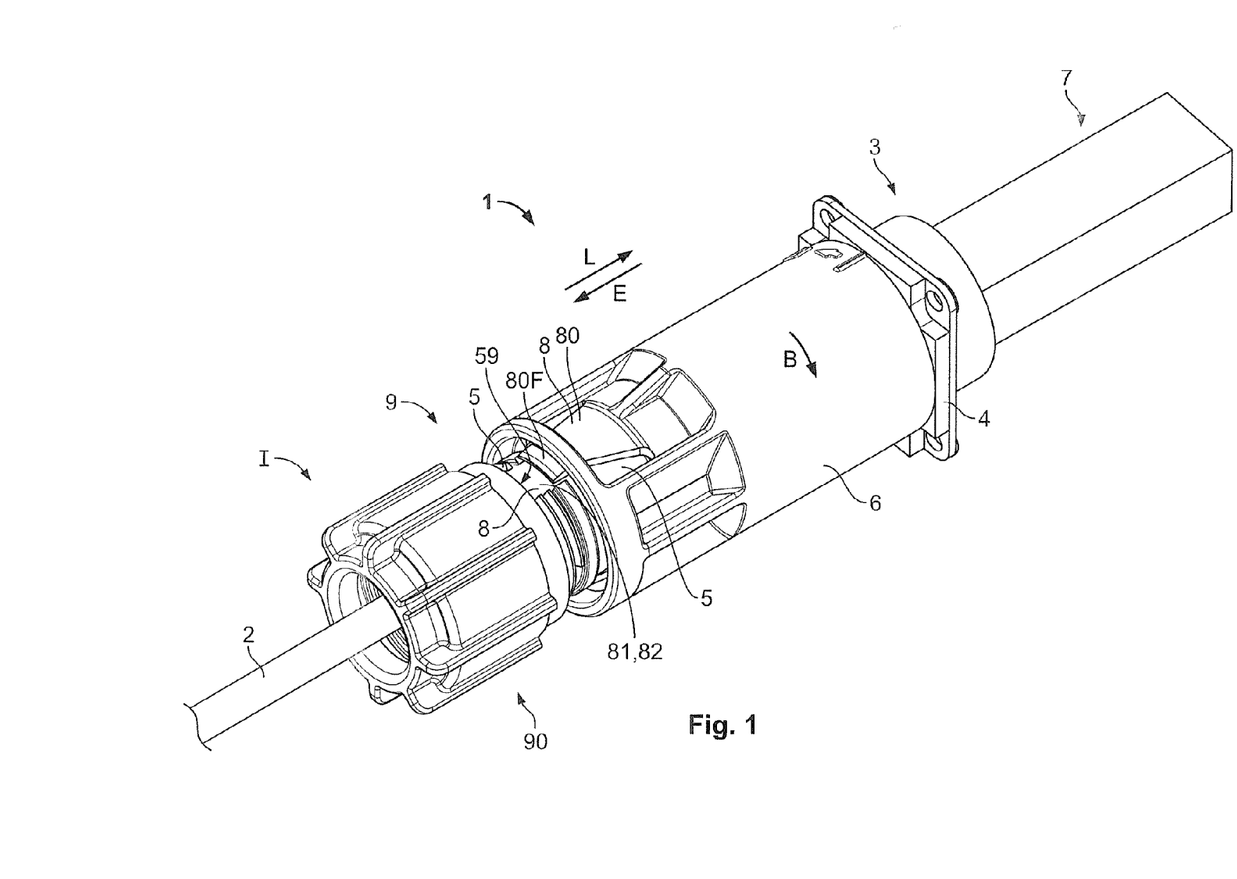
FIG. 1 is a perspective view of a connector assembly having a connector in a partial mating position with a complimentary mating connector.

In an embodiment shown in FIG. 1, a connector assembly has a connector 1 with an inner housing 5 and an outer housing 6, and a complimentary mating connector 3. For purposes of brevity, the mating connector 3 is shown only in parts.

In an embodiment, the mating connector 3 has a base plate 4 that connects to an inner housing 5 or an outer housing 6 of the connector 1, or to both housings 5,6. The mating connector 3 also has a transceiver 7 when the cable 2 is an optical cable, in particular an optical fibre, through which information is transmitted by light. When the connector 1 is mated with the mating connector 3, the inner housing 5 is prevented from rotating relative to the base plate 4 about a longitudinal axis L of the connector 1. Further, the housing 5 is prevented from moving further towards the base plate 4. Instead, movement of the inner housing 5 relative to the base plate 4 is limited along an extraction direction E, the extraction direction E being opposite to a mating direction L. However, such a movement of the inner housing 5 is blocked by the outer housing 6, in which the inner housing 5 has been received, and which has been fixed to the base plate 4 and to the inner housing 5 by rotating the outer housing 6 relative to the inner housing 5 and the base plate 4 about the mating direction L and along the rotational direction B. Thus, in the state of FIG. 1, the inner housing 5 and the outer housing 6 are rigidly connected to the base plate 4.

In FIG. 1, the rigid connection between the inner housing 5 and the base plate 4 can still be undone, as the inner housing 5 is not yet rotationally locked to the outer housing 6. To allow such rotatory locking, the connector has a rotational locking mechanism 8, which in FIG. 1 does not yet couple the housing 5 to the outer housing 6 in a rotatory locked manner, i.e. in a rotation blocking manner in which any rotation of the two housings 5,6 relative to each about the mating direction L is blocked.

The rotational locking mechanism 8 includes a cantilevered locking arm 80 that is elastically deflectable. In an embodiment, the locking arm 80 has an arm, tab, finger, or tongue-like shape. The locking arm 80 has a free end 80F with a shape that is complementary to a groove 81 positioned on the inner housing 5. The groove 81 is thus a counter locking element 82 of the rotational locking mechanism 8.

Figure 2:
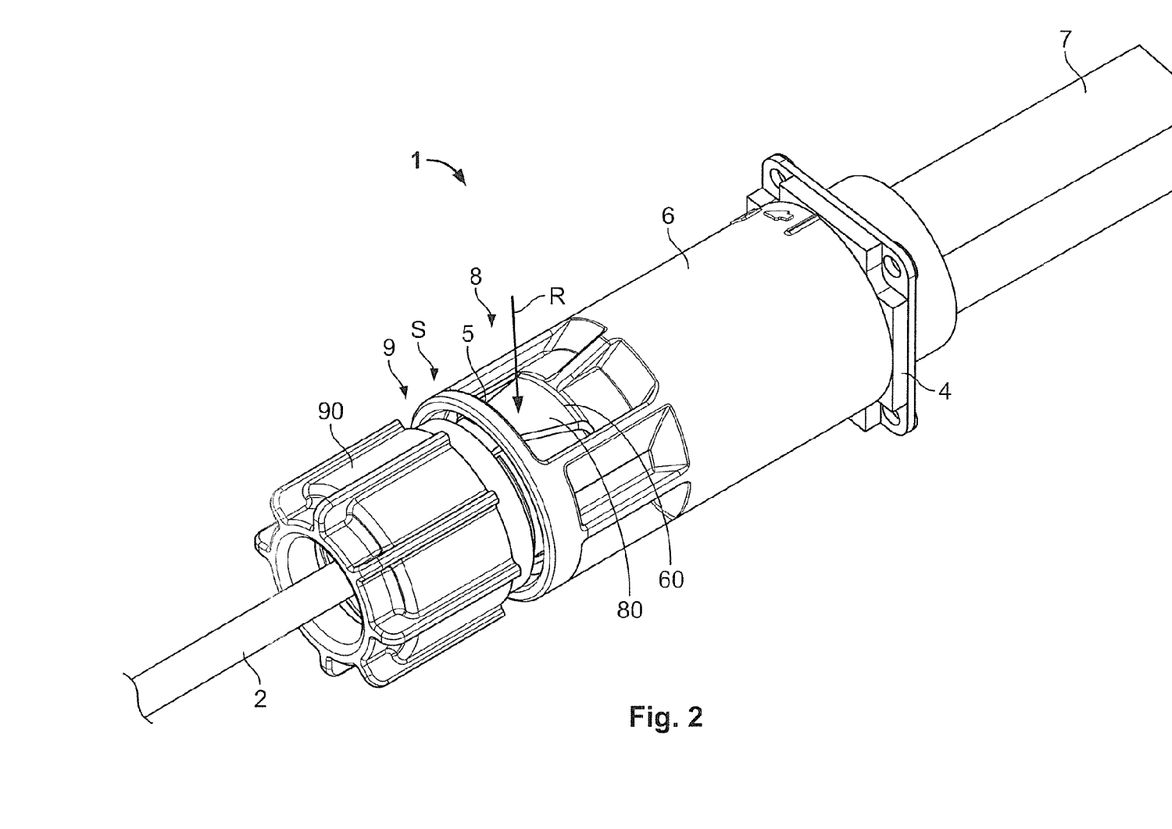
FIG. 2 is a perspective view of the connector assembly of FIG. 1, where the connector is partially mated with the mating connector.
Figure 3:
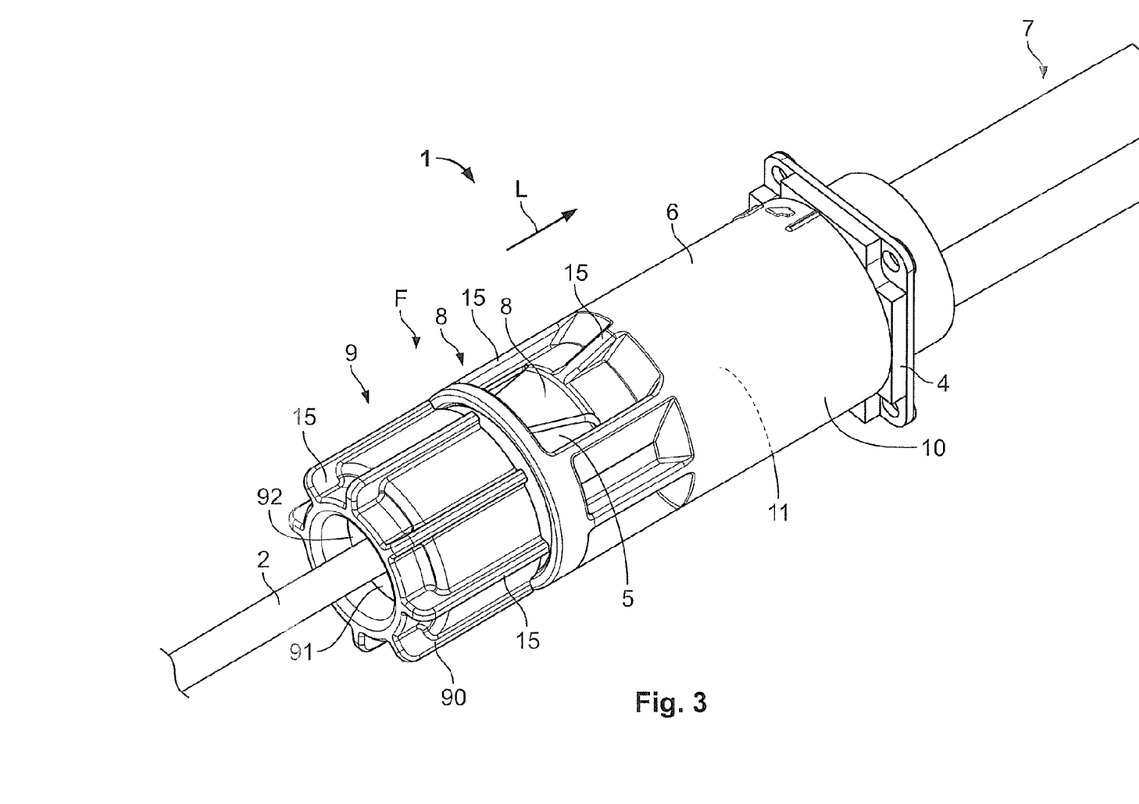
FIG. 3 is a perspective view of the connector assembly of FIGS. 1 and 2, where the connector is in a final mating position with the mating connector.

The connector 1 further has a strain relieving attachment mechanism 9. The strain relieving attachment mechanism 9 connects the cable 2 to the connector 1, in particular to the inner housing 5, in a strain-relieving manner. When the strain relieving attachment mechanism 9 is in operation, a possible strain from the cable 2 is directed through a nut 90 and a cable engagement member 91 to the inner housing 5 and the outer housing 6, and, consequently, to the base plate 4. Thus, strain from the cable 2 does not damage elements that are positioned inside the inner housing 5. The strain relieving attachment mechanism 9 has the nut 90. The nut 90 can move along an assembly path with respect to the inner housing 5. The assembly path begins at a preliminary mating position I (See FIG. 1), where the nut 90 is brought into contact with the inner housing 5. As shown in the embodiments of FIGS. 1-3, the nut 90 is then screwed to the inner housing 5. The assembly path thus has a helical shape. In FIG. 1, the strain relieving attachment mechanism 9 is not yet in a full operational state and does not yet lock the cable 2 to the inner housing 5 in a strain-relieving manner.

In FIG. 2, the nut 90 has been rotated relatively to the inner housing 5 and is thus loosely connected to the inner housing 5. However, the strain relieving attachment mechanism 9 does not yet provide a full strain relief. The nut 90 and thus the strain relieving attachment mechanism 9 engages the rotational locking mechanism 8 by contacting the locking arm 80. FIG. 2 thus shows a locking position S of the strain relieving attachment mechanism 9. From the locking position S onward, the nut 90 presses the locking arm 80 of the outer housing 6 inward towards the groove 81 positioned on the inner housing 5. Thus, the rotational locking mechanism 8 couples the inner housing 5 to the outer housing 6 in a rotationally rigid manner. When the nut 90 is further rotated onto the housing 5, the inner housing 5 and the outer housing 6 are rotationally locked to each other. Thus, the inner housing 5, the outer housing 6 and the base plate 4 are rigidly connected to each other and are prevented from being moved relative to each other. In particular, the housings 5,6 are prevented from rotating relative to each other about the mating direction L.

The locking arm 80 is deflected towards the inner housing 5 along a radial direction R. In order to inspect whether the locking arm 80 is locked, and in order to manually engage or release the locking arm 80, the outer housing 6 has an opening 60. The opening 60 permits the rotational locking mechanism 8 to be accessible from outside. The rotational locking mechanism 8 extends into the opening 60, and is positioned therein. As such, the connector assembly is compact.

In an embodiment shown in FIG. 3, the rotational locking mechanism 8 is in a final mating position F. In the final mating position F, no further rotation of the nut 90 onto the housing is possible. The final mating position F is thus the end of the assembly path. In the final mating position F, the strain relieving attachment mechanism 9 is in full operation and fixes the cable 2, through a cable engagement member 91, to the inner housing 5 and thus to the base plate 4 in a strain-relieving manner. Further, the rotational locking mechanism 8 is still in operation and blocks a rotational movement of the inner housing 5 relative to the outer housing 6 around a mating direction L.

As shown in the embodiments of FIGS. 1-3, the strain relieving attachment mechanism 9, in particular the nut 90 together with the locking arm 80, ensures that the rotatory locking motion between the inner housing 5 and the outer housing 6 is performed before the strain relieving attachment mechanism 9 comes into full operation. Thus, when installing the connector, the cable 2 is still not fixed in a strain-relieving manner in the connector when the rotatory locking motion between the inner housing 5 and the outer housing 6 occurs. Additionally, when disassembling the connector 1, as would be done when the sequence is performed from FIG. 3 backwards to FIG. 1, and thus from the final mating position F via the locking position S to the initial position I, the cable 2 is firstly released to prevent damage to the cable 2 or elements attached to the cable 2. The cable 2 is released before the rotatory locking motion disengages the inner housing 5 and the outer housing 6.

Consequently, whenever the cable 2 is fixed to the connector 1, the inner housing 5 and the outer housing 6 are locked relative to each other and the connection is prevented from being opened. Hence, the rigid connection between the inner housing 5, the outer housing 6 and the base plate 4 is prevented from becoming disengaged before the cable 2 is released.

In the embodiment shown in FIG. 3, a transceiver connecting element 10 is also shown. The transceiver connecting element 10 is positioned within a cable receiving space 11 in the inner housing 5 and serves to connect the transceiver 7 to the cable 2.

In order to allow a better gripping of the outer housing 6 and the nut 90, the outer housing 6 and the nut 90 have rib-like gripping elements 15.

Figure 4:
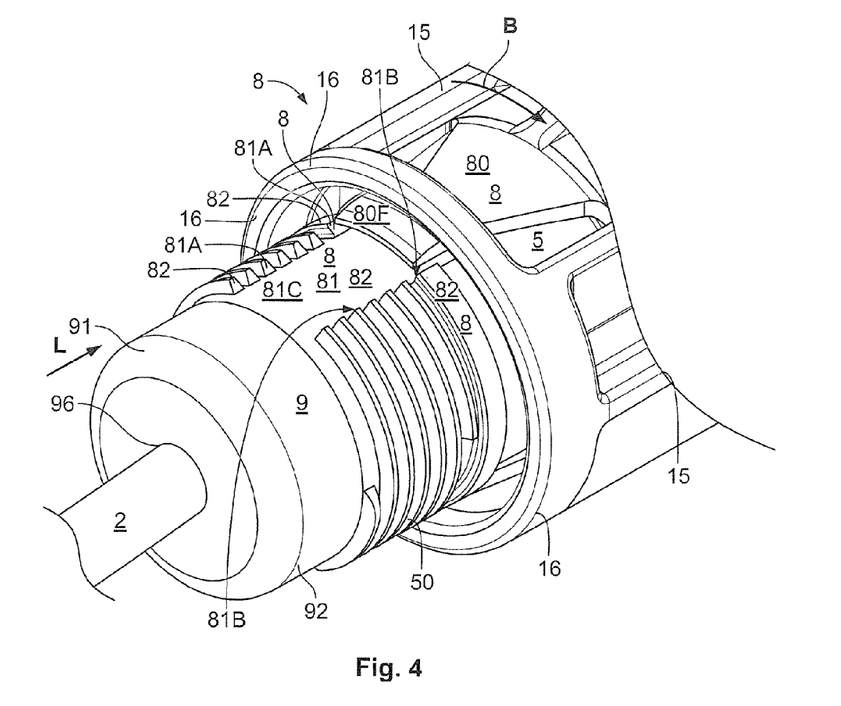
FIG. 4 is a perspective view of the connector assembly of FIGS. 2 and 3 with a nut removed.

In an embodiment shown in FIG. 4, the nut 90 has been removed for a more detailed view of various components. The rotational locking mechanism 8 is in the locked state in which the inner housing 5 is coupled to the outer housing 6 in a rotationally or torsionally rigid manner. Thus, the outer housing 6 is prevented from rotating about the mating direction L relative to the inner housing 5, neither in the rotational direction B, nor against the rotational direction B.

The inner housing 5 has a helical thread 50 positioned on an outer surface thereof, the thread 50 being complimentary to a corresponding counter thread 95 positioned on an inner surface of the nut 90.

The strain relieving attachment mechanism 9 also has a radially compressible body 92 that serves as a cable engagement member 91. The compressible body 92 has a cable receiving passageway 96 that receives the cable 2. In an uncompressed state, the cable receiving passageway 96 has a diameter that is slightly larger than the cable 2, so that the cable 2 can be inserted into the compressible body 92. The compressible body 92 is then compressed by the nut 90, when the nut 90 is screwed to the inner housing 5. During compression, the diameter of the cable receiving passageway 96 gets smaller, such that the compressible body 92 tightly holds the cable 2. Thus, the cable engagement member 91 engages the cable 2 when the nut 90 is tightened along the helical thread 50 of the inner housing 5. However, this tightening, and thus the engaging operation, occurs after the strain relieving attachment mechanism 9 has passed the locking position S. Thus, the cable 2 is fixed after when the rotational locking mechanism 8 locks the inner housing 5 to the outer housing 6. In turn, when disassembling the connector 1, the cable engagement member 91 must first be moved out of operation before the rotational locking mechanism 8 can unlock the connection between the inner housing 5 and the outer housing 6. Thus, the risk of damage to the cable 2 due to the rotational operations of the connector 1 while the cable 2 is still fixed can be avoided, as compared to the conventional connector. Further, such connector 1 can be operated more easily, as the locking with the rotational locking mechanism 8 is completed when the strain relieving attachment mechanism 9 is operated. Thus, only one operation is necessary instead of two.

The outer housing 6 has a compression ring 16, on which the locking arm 80 is also located. The compression ring 16 serves to compress a complimentarily-shaped compressing lip 94 of the nut 90, which pushes down the locking arm 80 in the radial direction R. The compressing lip 94 and the locking arm 80 both have a wedge-like shape that tapers towards a compressing end 94F of the nut 90 and the free end 80F of the locking arm 80, respectively, to allow an easier contacting and deflecting. In the radial direction R, the compressing lip 94 has a width that prevents the free end 80F of the locking arm 80 from disengaging from the rotatory locking motion. If the free end 80F is displaced outwards against the radial direction R, the force is transmitted via the compressing lip 94 to the compression ring 16. The compression ring 16 is, due to the closed ring structure, very rigid and consequently prevents movements of the compressing lip 94. Consequently, the free end 80F is prevented from moving outwards against the radial direction R.

Figure 5:
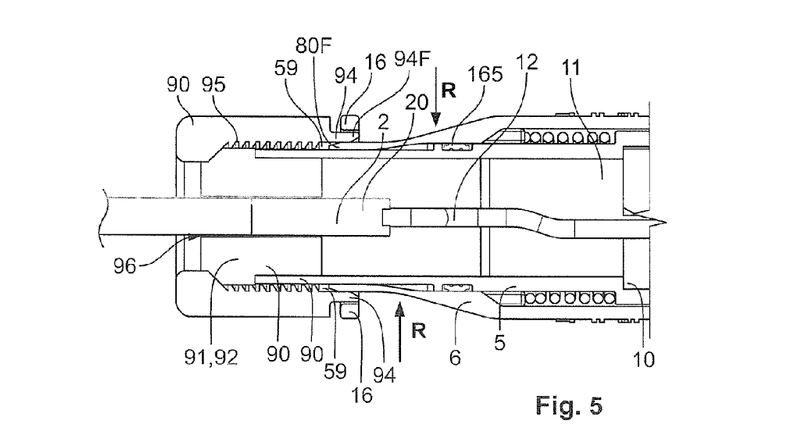
FIG. 5 is a cross-sectional view of the connector in FIG. 3.

In an embodiment shown in FIG. 5, the cable receiving space 11 has a cable receiving end, through which a free end 20 of the cable 2 extends to protrude into the cable receiving space 11. The free end 20 allows a small elastic deflection of the cable 2. On an opposite end, a free end 12 of the transceiver connecting element 10 protrudes into the cable receiving space 11. The free end 12 of the transceiver connecting element 10 plugs into the free end 20 of the cable 2. Since the strain exerted onto the cable 2 is relieved by the strain relieving attachment mechanism 9 via the inner housing 5, the elements within the cable receiving space 11 are isolated from the strain and are thus floating in the cable receiving space 11.

The nut 90 can be screwed to the inner housing 5. Together with the inner housing 5, the nut 90 forms a locking arm receiving space 59 for the free end 80F of the locking arm 80. Thus, the free end 80F is protected and cannot be damaged or be moved out of the groove 82.

In the embodiment shown in FIG. 5, a sealing element 165 is positioned between the inner housing 5 and the outer housing 6.

Figure 6:
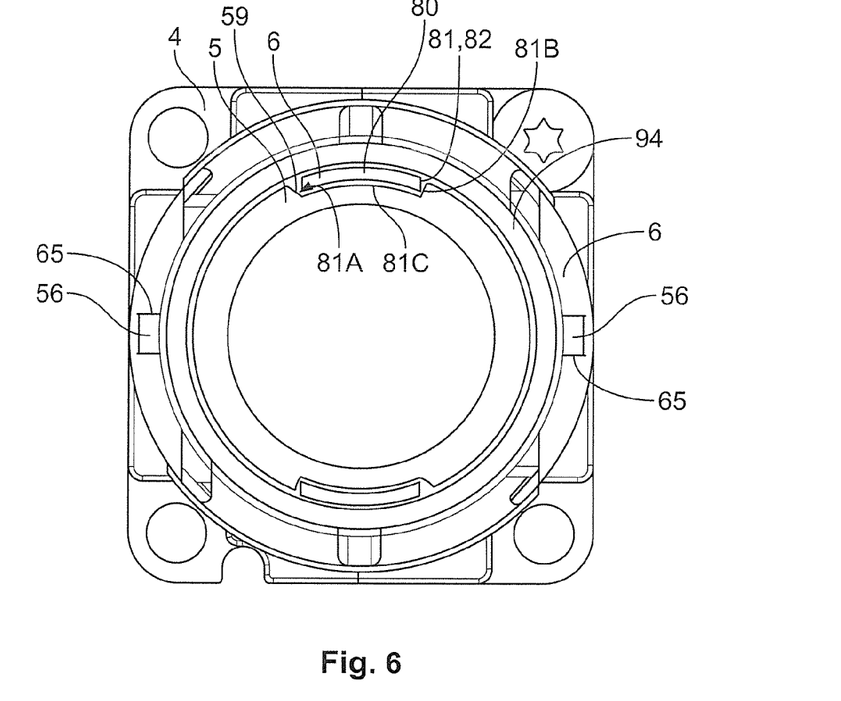
FIG. 6 is a front elevation view of the connector together with a part of a mating connector.

In an embodiment of FIG. 6, a cable receiving end of the connector 1 together with the base plate 4 is shown. It should be noted that, as in the previous figures, some lines are shown that would normally be hidden. However, for better understanding, these lines are shown as full lines. In particular, first locking elements 56 that are located on the inner housing 5 and serve to connect the inner housing 5 to the outer housing 6 in the bayonet style can be seen. The first locking elements 56 protrude radially outward from the inner housing 5. Also see the embodiments of FIGS. 7A, 7B, and 7C.

Figure 7A:
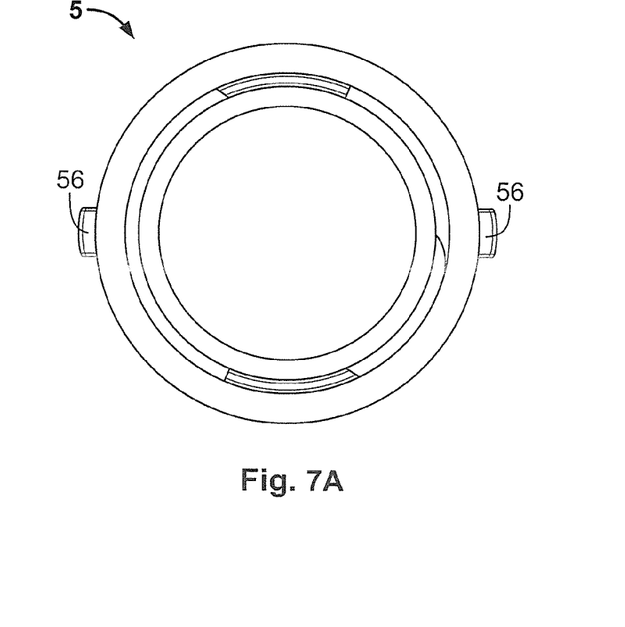
FIG. 7A is a front elevation view of an inner housing of the connector.
Figure 7B:
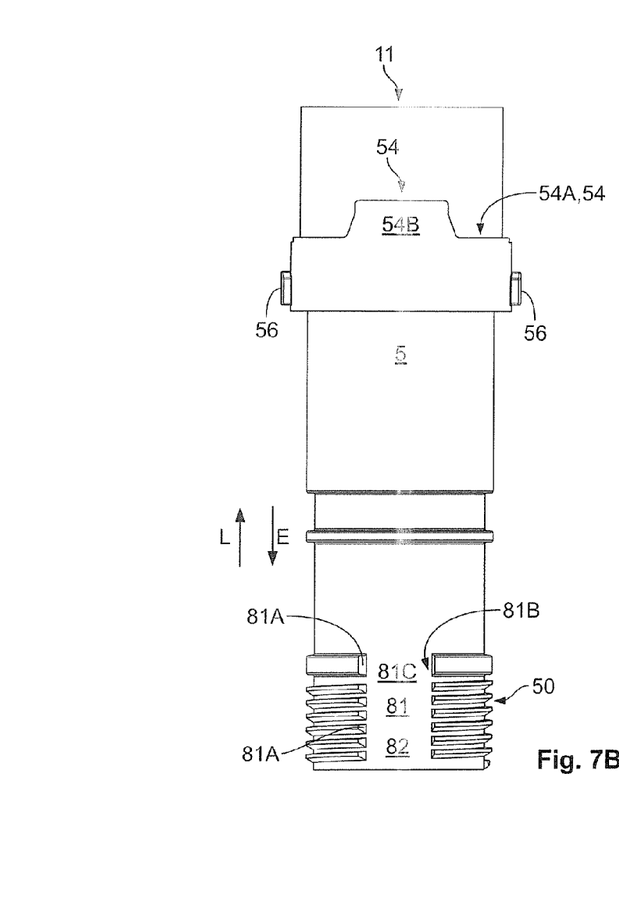
FIG. 7B is a side elevation view of the inner housing.

As shown in the embodiments of FIGS. 6, 4 and 7B, the groove 81 of the inner housing 5 is extends along the longitudinal axis L, through the helical threads 50. The helical threads 50 are thus not contiguous, but rather, are segmented by the groove 81. A side wall 81A of the groove 81 that can be found on the left hand side in FIGS. 4, 6, 7B is slanted or inclined. The side wall 81A is thus, generally not perpendicular to the cylindrical outer shape of the inner housing 5 in this area and to a bottom surface 81C of the groove 81. The side wall 81A thus provides a ramp-like structure which assists in disengaging the latch-like locking arm 80 by rotating the inner housing 5 relative to the outer housing 6 about the mating direction L, for example, if the locking arm 80 has lost its elasticity due to an aging of the material. An oppositely positioned side wall 81B, however, extends approximately perpendicular from the bottom surface 81C, rather than being inclined from the inner housing 5. This prevents the outer housing 6 from rotating towards the sidewall 81B due to the bayonet-like connection of the two housings 5, 6.

Figure 7C:
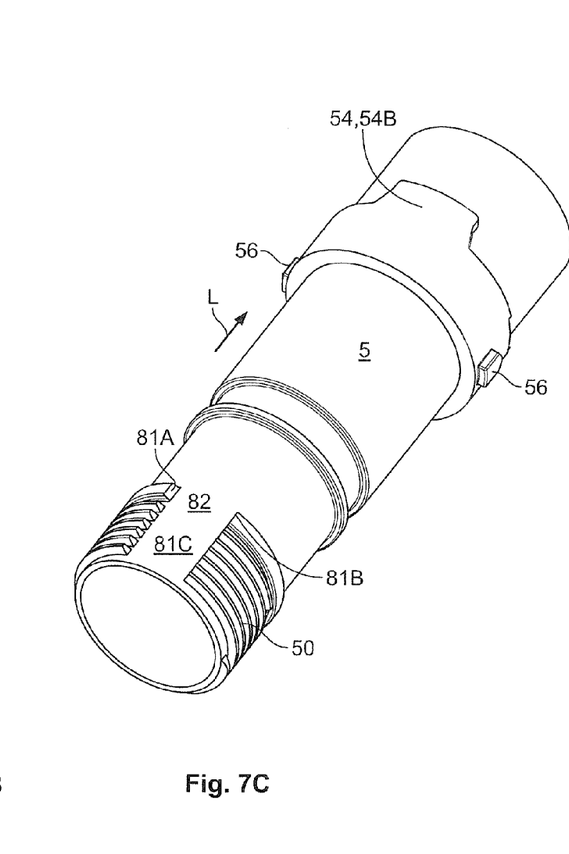
FIG. 7C is a perspective view of the inner housing.
Figure 8A:
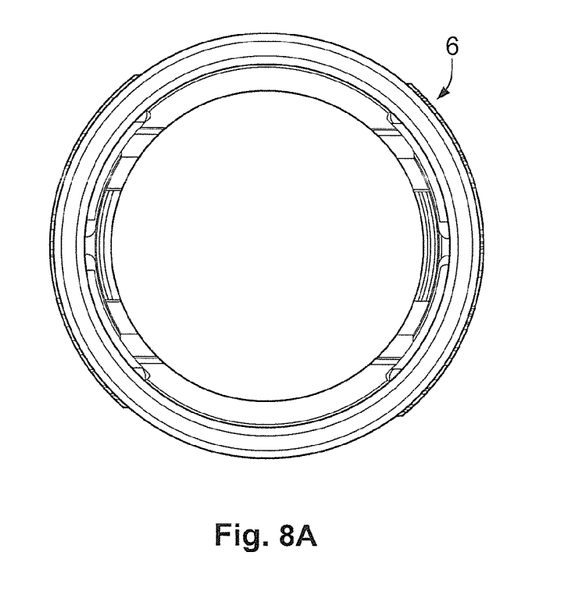
FIG. 8A is a front elevation view of an outer housing of the connector.
Figure 8B:
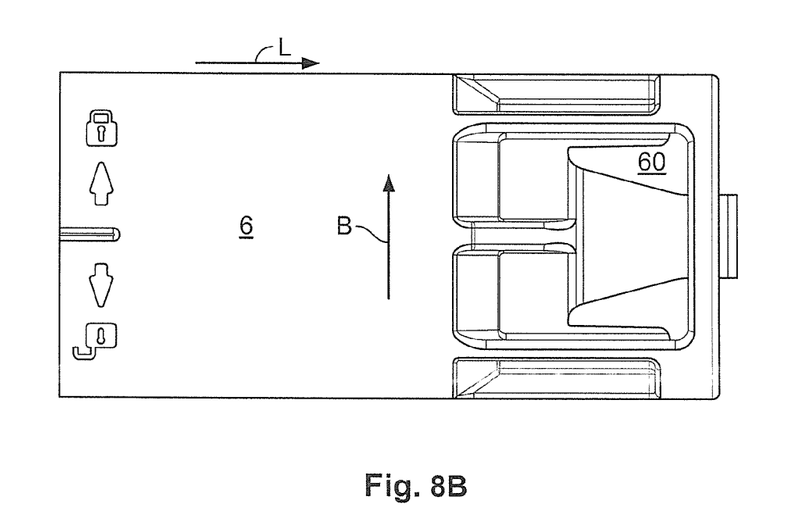
FIG. 8B is a plan view of the outer housing.
Figure 8C:
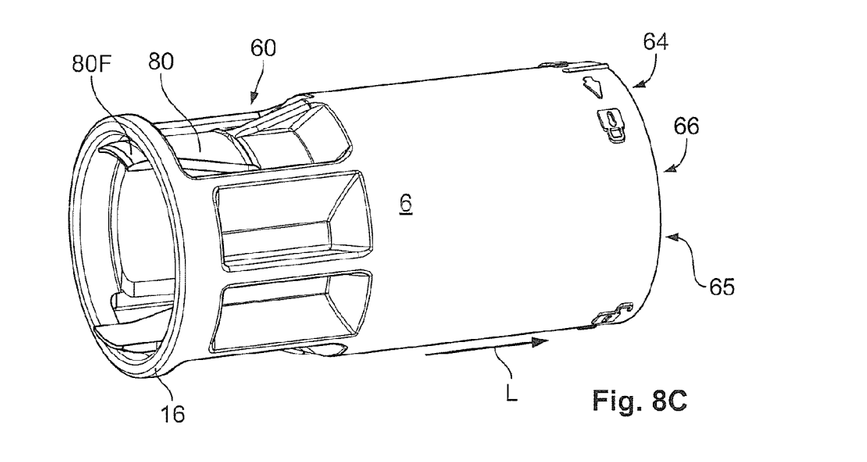
FIG. 8C is a perspective view of the outer housing.
Figure 8D:
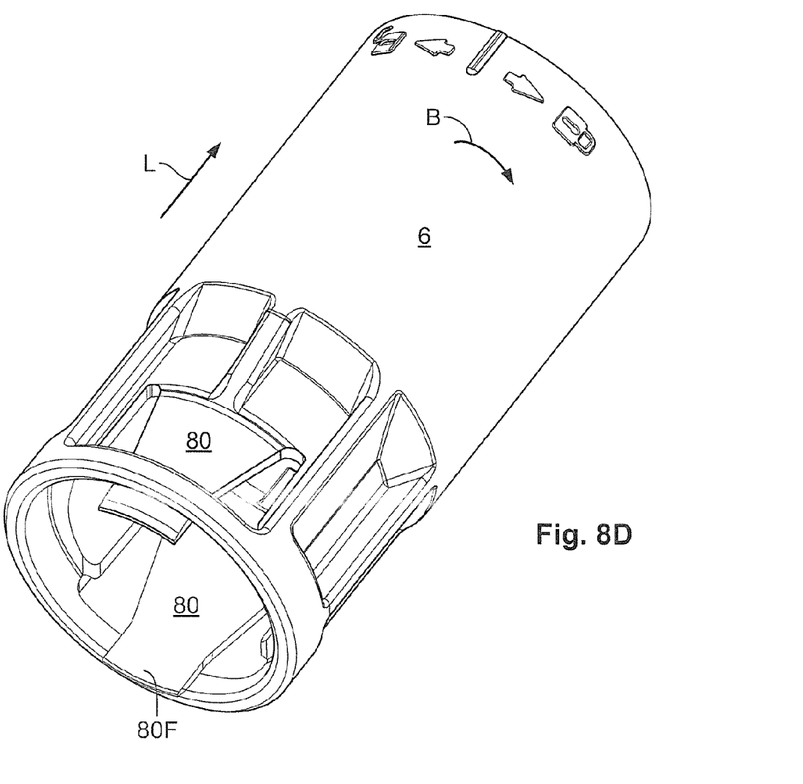
FIG. 8D is a perspective view of the outer housing.
Figure 9A:
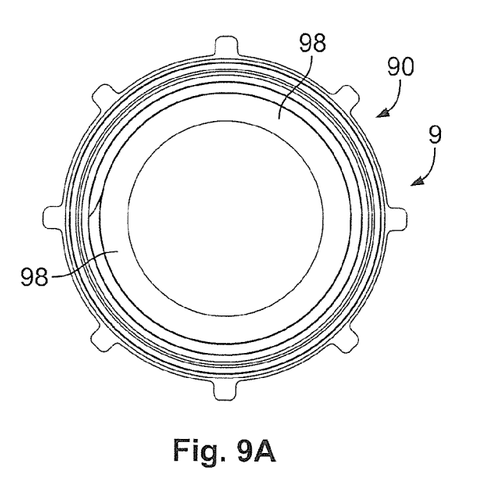
FIG. 9A is a plan view of a first end of the nut.
Figure 9B:
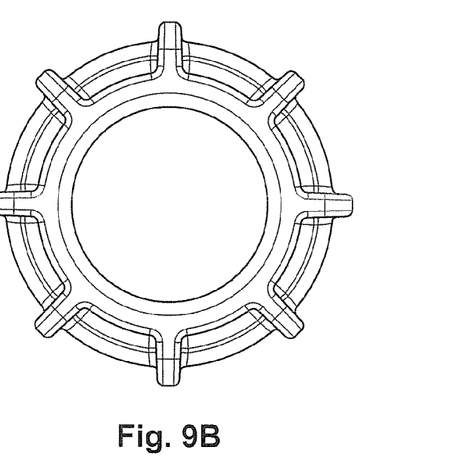
FIG. 9B is a plan view of an opposite second end of the nut.
Figure 9C:
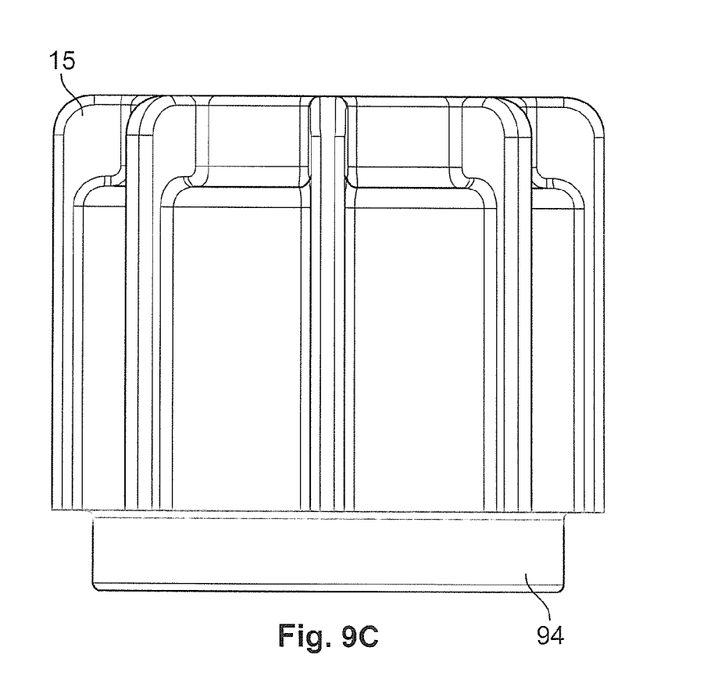
FIG. 9C is an elevation view of a side of the nut.
Figure 9D:
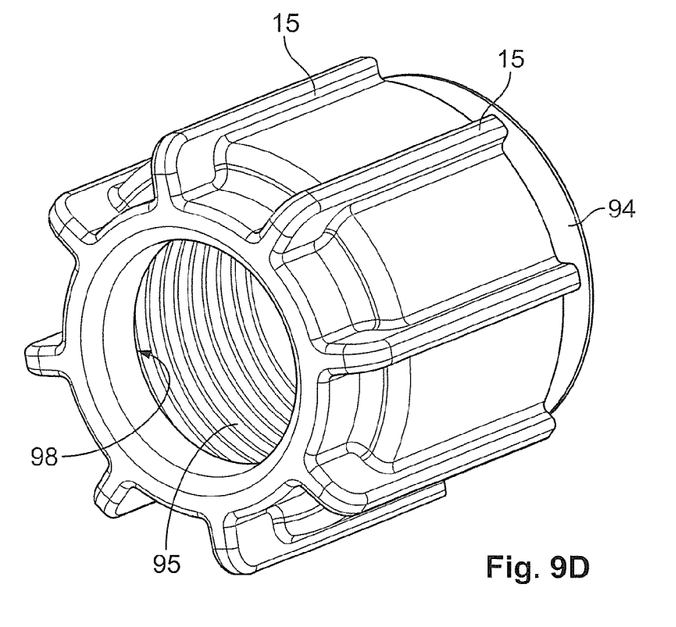
FIG. 9D is a perspective view of the second end of the nut.
Figure 9E:
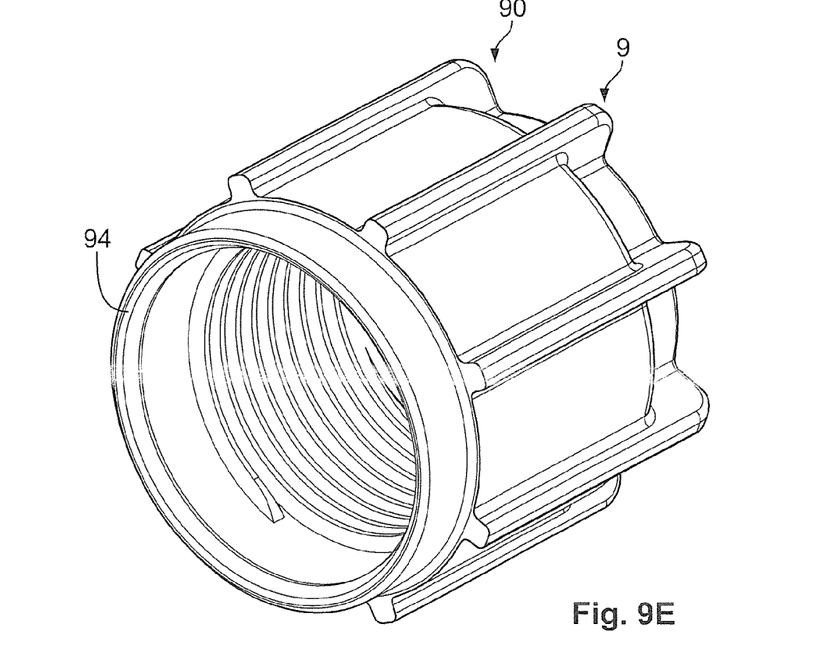
FIG. 9E is a perspective view of the first end of the nut.

In the embodiments of FIGS. 7A, 7B and 7C, second locking elements 54 located on the inner housing 5 that serve to fix the inner housing 5 to the base plate 4 are shown. The second locking elements 54 have stopping faces 54A that block a further insertion of the inner housing 5 to the base plate 4, and blocking protrusions 54B that block a rotation in the lateral movement of the inner housing 5 relative to the base plate 4. In the inserted state, the inner housing 5 can thus only be moved out of contact with the base plate 4 counter to the mating direction L and in the extraction direction E. However, this movement is blocked by the outer housing 6 when the members of the first locking elements 56 on the inner housing 5 engage corresponding third locking elements 65 positioned on an inside of the outer housing 6.

In the embodiments shown in FIGS. 8A, 8B, 8C and 8D, the inner housing 6 has a terminating end 66 facing the base plate 4 in the connected state, the terminating end 66 having the locking elements 64, 65 for fixing the outer housing 6 to the base plate 4 and the inner housing 5, respectively.

In the embodiments shown in FIGS. 9A, 9B, 9C, 9D and 9E, the nut 90 has an outer surface with gripping elements 15 that protrude in a rib-like manner radially outwards. On an inner surface, the nut 90 has a counter thread 95 for engaging the helical threads 50 positioned on the outer surface of the inner housing 5. To allow a rotation relative to the ring-like compression ring 16, the compressing lip 94 has a cylindrical outer shape. In order to squeeze the compressible body 92, the nut 90 has a pressing face 98.

What is claimed is:

1. A connector for a cable, comprising:
   an outer housing;
   an inner housing at least partially received within the outer housing;
   a strain relieving attachment mechanism having an assembly path with an preliminary mating position and a final mating position; and
   a rotational locking mechanism engaged with the strain relieving attachment mechanism along the assembly path from a locking position located between the preliminary mating position and the final mating position, the rotational locking mechanism coupling the inner housing to the outer housing in a rotatory locked manner upon engagement with the strain relieving attachment mechanism.

2. The connector according to claim 1, wherein the rotational locking mechanism has at least one cantilevered locking arm whose free end is deflected by the strain relieving attachment mechanism when the strain relieving attachment mechanism is engaged with the rotational locking mechanism.

3. The connector according to claim 1, wherein the outer housing has a rotational locking mechanism receiving through hole into which the rotational locking mechanism is positioned.

4. The connector according to claim 1, wherein the strain relieving attachment mechanism is screwable onto at least one of the inner housing and the outer housing.

5. The connector according to claim 1, wherein the inner housing and the outer housing are rotatable with respect to each other when the rotational locking mechanism is located between the preliminary mating position and the locking position.

6. The connector according to claim 1, wherein the strain relieving attachment mechanism includes a cable engagement member extending into a receiving space of at least one of the inner housing and the outer housing.

7. The connector according to claim 6, wherein the strain relieving attachment mechanism engages the cable after the strain relieving attachment mechanism has passed the locking position.

8. The connector according to claim 6, wherein the cable engagement member includes a radially compressible body.

9. The connector according to claim 8, wherein the radially compressible body has a cable receiving passageway.

10. The connector according to claim 1, wherein the inner housing and the outer housing both have mating connector locking elements positioned on an end opposite the strain reliving attachment mechanism.

11. The connector according to claim 1, wherein the strain relieving attachment mechanism is positioned on an end of the inner housing.

12. The connector according to claim 1, wherein the strain relieving attachment mechanism is a nut having a cable receiving passageway.

13. The connector according to claim 12, wherein the preliminary mating position is defined as when the nut contacts an end of the inner housing.

14. The connector according to claim 13, wherein the locking position is defined as when the nut has been partially screwed onto the inner housing.

15. The connector according to claim 14, wherein the final mating position is defined as when the nut has been fully screwed onto the inner housing.

16. The connector according to claim 15, wherein the rotational locking mechanism includes a cantilevered locking arm whose free end is deflected inward by the nut when the nut is in the locking position and the final mating position.

17. The connector according to claim 16, wherein the inner housing has an outer surface with a helical thread, and a locking arm receiving groove extending longitudinally through the helical thread.

18. The connector according to claim 17, wherein the free end of the cantilevered locking arm is positioned in the locking arm receiving groove when the nut is in the locking position or the final mating position.

19. The connector according to claim 18, wherein the strain relieving attachment mechanism includes a cable engagement member having a radially compressible cable receiving body with a cable receiving passageway that is compressed when the nut is in the final mating position.

20. A connector assembly comprising:
 a connector having:
  an outer housing,
  an inner housing at least partially received within the outer housing,
  a strain relieving attachment mechanism having an assembly path with an preliminary mating position and a final mating position, and
  a rotational locking mechanism engaged with the strain relieving attachment mechanism along the assembly path from a locking position located between the preliminary mating position and the final mating position, the rotational locking mechanism coupling the inner housing to the outer housing in a rotatory locked manner upon engagement with the strain relieving attachment mechanism; and
 a complimentary mating connector locked to the inner housing and the outer housing by the strain relieving attachment mechanism when the strain relieving attachment mechanism is between the locking position and the final mating position.

* * * * *